(No Model.) 2 Sheets—Sheet 1.
S. C. OLIPHANT.
GOLD SEPARATOR.
No. 331,649. Patented Dec. 1, 1885.
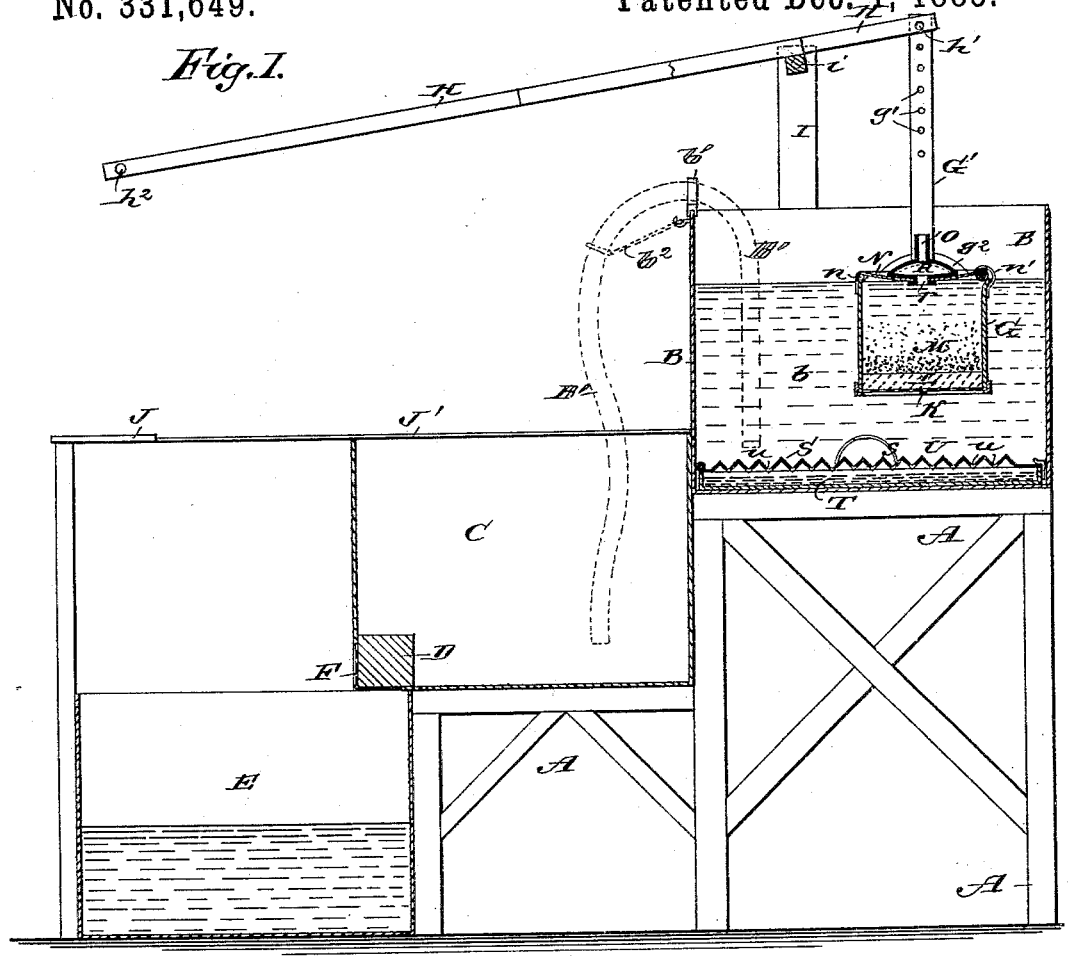
Fig. 1.
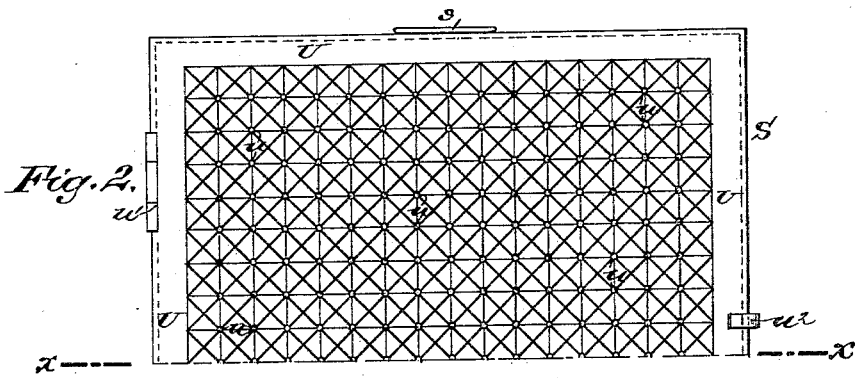
Fig. 2.
Fig. 3.
WITNESSES: INVENTOR:
Saml. C. Oliphant
BY Munn & Co
ATTORNEYS.

(No Model.) 2 Sheets—Sheet 2.
S. C. OLIPHANT.
GOLD SEPARATOR.
No. 331,649. Patented Dec. 1, 1885.
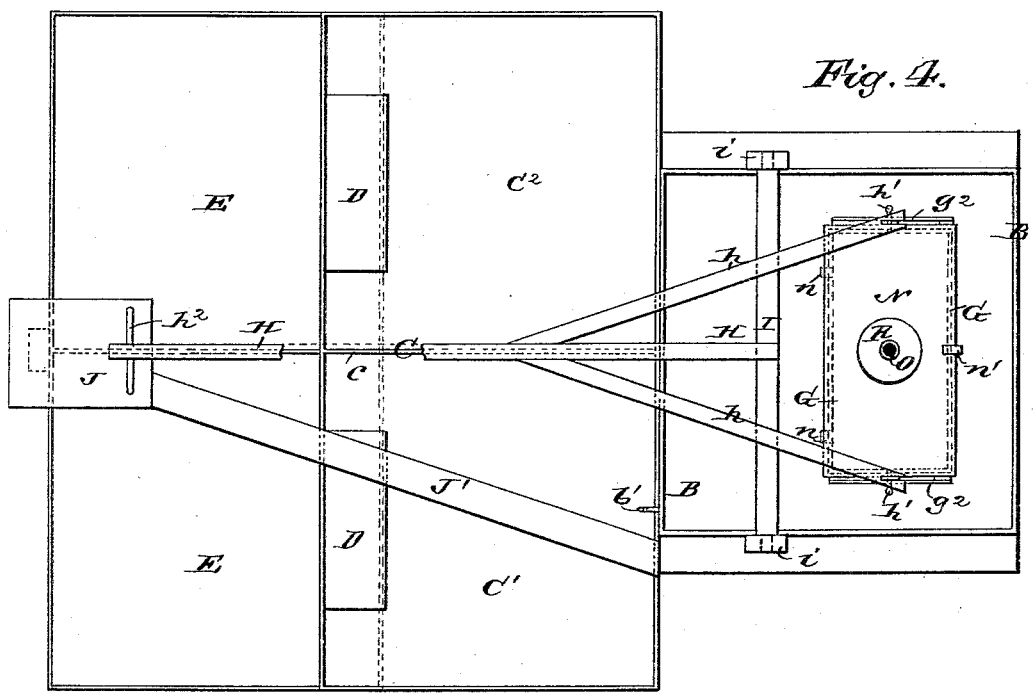
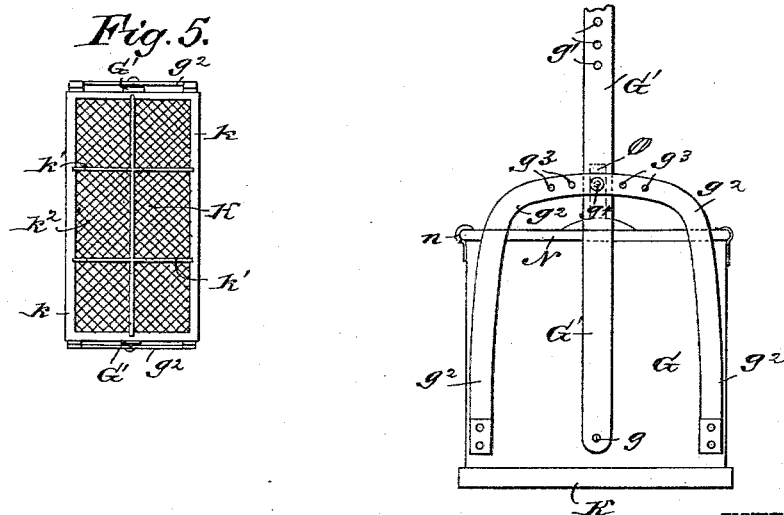
WITNESSES: INVENTOR:
Saml. C. Oliphant.
BY Munn & Co
ATTORNEYS.

UNITED STATES PATENT OFFICE.

SAMUEL C. OLIPHANT, OF NOVINGER, MO., ASSIGNOR TO HIMSELF, SAMUEL M. PICKLER, AND WILLIAM H. JOHNSON, ALL OF SAME PLACE.

GOLD-SEPARATOR.

SPECIFICATION forming part of Letters Patent No. 331,649, dated December 1, 1885.

Application filed July 23, 1885. Serial No. 172,419. (No model.)

*To all whom it may concern:*

Be it known that I, SAMUEL C. OLIPHANT, of Novinger, in the county of Adair and State of Missouri, have invented a new and Improved Gold-Separator, of which the following is a full, clear, and exact description.

My invention relates to gold-separating machines adapted particularly for the working of auriferous sands or gravels containing free gold, and has for its object to promote a better separation of the gold, especially the finer gold particles contained in very fine sands, so as to avoid waste of the gold, and also to secure the effective separation of the gold with a minimum supply of water. I use a main water-tank and water filtering and receiving tanks, and a plunger worked in the main tank by a jigger-arm.

The invention consists in particular constructions and combinations of parts of the gold-separator, all as hereinafter fully described and claimed.

Reference is to be had to the accompanying drawings, forming part of this specification, in which similar letters of reference indicate corresponding parts in all the figures.

Figure 1 is a vertical sectional elevation of the separator. Fig. 2 is an enlarged plan view of part or half of the gold-receiving pan, its cover being closed. Fig. 3 is a vertical sectional elevation of the gold-receiving pan, taken on the line $x\,x$, Fig. 2. Fig. 4 is a plan view of the separator, drawn to the same scale as Fig. 1, the gold-receiving pan being removed from the main tank and the jigger-arm being partly broken away. Fig. 5 is a bottom view of the plunger-sieve, and Fig. 6 is an enlarged end view of the plunger-sieve and part of one of its hangers.

The letter A indicates a suitable framework or support on which is placed the main tank B, in which the plunger-sieve is operated, and below tank B is placed a tank, C, divided into two compartments, $C'\,C^2$, by a central partition, $c$, and into either of which compartments the water $b$ from tank B may be delivered by a tube, B', bent to form a siphon, and supported on the tank B by a collar, $b'$, and it may be also by a suitable cord, $b^2$, as shown in dotted lines in Fig. 1.

Each of the compartments $C'\,C^2$ of tank C is provided with a stone filter, D, made preferably of sandstone, said filters being placed over openings through which the filtered water may pass into storage-tanks E, placed below the tank C, and from which tanks E the water may be taken for use over and over again in the main tank B, this arrangement of the water-tanks permitting the working of the separator with a comparatively small quantity of water. The tanks may be otherwise arranged, but the relative positions shown are at present preferred. If desired, fine sievecloth F may be placed over the outlets from the tank C, and beneath the stone filters D, as shown in Fig. 1. The filters D serve not only to filter the water, but to save the very fine gold as the water filters through them, which gold may be recovered by any approved process.

The letter G indicates the plunger-sieve, to opposite ends of which are connected pivotally at $g$ the upright bars G', which have a series of holes, $g'$, for the passage of pivot-pins $h'$, which also pass through the slotted ends of the diagonally-ranging arms or hounds $h\,h$ of the jigger-arm H, which is pivoted at $i\,i$, at the ends of its cross-beam, to the posts I I, fixed either to the tank B or frame A. The arm H extends backward from tank B a sufficient distance to afford a good leverage for working it up and down by its handle cross-bar $h^2$, which may be grasped by a man standing on a platform, J, for lowering and raising the plunger-sieve G in the tank B. A plank, J', leads from the platform J to the tank, to allow the operator to pass to and from the tank. Curved or arched top bars or plates $g^2$ are fixed to the opposite ends of the plunger-sieve, and these bars $g^2$ have a series of holes, $g^3$, into any one of which a pin or set-screw, $g^4$, may be passed into a hole in the hanger G', for leveling the plunger to insure its best operation in the tank B, and the bars $g^2$ serve also as handles in adjusting the sieve to the jigger-arm in the tank.

I make the plunger G with a sieve-bottom, K, consisting of a frame, $k$, and suitable crossbars, $k'$, which gives support to the sieve wire or cloth $k^2$; or it may be a wire-netting made of one-quarter-inch iron bars or rods. On this cloth or netting rests the body of lead L, consisting of lead cuttings of various shapes and sizes. The sand M to be operated upon is filled into the plunger over the lead cuttings in suitable quantity to be relieved of the gold, as presently explained. The top or cover N of the plunger G is hinged to the plunger at one side, as at $n$, and a suitable catch, $n'$, is arranged opposite the hinges to lock the cover closed, and, if preferred or necessary, a suitable packing will be used between the plunger and its cover to insure a tight joint.

To the cover N is fixed a tube, O, which communicates with the interior of the plunger and projects above the cover sufficiently to prevent entrance of water through it to the interior of the plunger, when it is worked up and down in the tank B, and so as to allow the air to pass freely into and out of the plunger as the bodies of lead and sand L M in the plunger are shifted or agitated by the sudden jigging motions of the plunger in the tank.

I prefer to make the plunger-cover N mainly of a flexible or elastic material—such as rubber webbing—fixed to a frame, to which the cover-hinges connect, and I prefer to fasten to the flexible material a hollow chamber, R, made of tin or some light material. The air-tube O is fixed to the upper wall of chamber R, which has an outlet or passage, $r$, through its lower wall to the interior of the plunger. (See Fig. 1.)

In the bottom of the tank B is placed the gold-receiver, which consists of a shallow pan, S, loosely fitting the side walls of the tank, and which has filled into it about a half-gallon of mercury, as at T, Fig. 1. The cover U of the pan S has apertures $u$, through which the gold passes to the mercury, said apertures $u$ being formed at the intersecting bases of a series of pyramidal corrugations, which guide the descending gold particles into and through the apertures $u$ to the mercury. The projections formed by the corrugations of the cover U may be of conical or other shape; but the pyramidal projections, as shown in Figs. 1, 2, and 3, are at present preferred. The cover is hinged to the pan S at $u'$, and locked to it at $u^2$, and the pan has handles $s$, by which it may be lifted from the tank B to discharge its contents into any suitable receptacle.

The operation is as follows: A suitable quantity of auriferous sand, M, is filled into the plunger G upon the bed L of lead cuttings— say up to about one-third or three-eighths the height of the plunger—and the cover is closed and latched. The plunger then will be submerged in the tank B, and will be given light jerking movements up and down by the jigger-arm H at about a speed of seventy strokes per minute, to loosen the bed L of lead cuttings and agitate the sand M at each stroke, and the fine gold will settle in and through the lead bed L, and will fall through the sieve-bottom K into the tank and upon the cover U of the pan S, and through the cover-apertures $u$ into the mercury T, which arrests it for subsequent treatment by any approved process.

In further explanation of the action of the plunger, I state that by its movements in the water-tank by the jigger-arm the larger pieces or particles of lead forming the lead-plate L in the plunger will settle to the bottom of the plunger, and the next smaller pieces on these, and so on with the smallest particles or pieces of the lead at the top of the lead bed, and the lead bed will be of sufficient depth in the plunger to prevent the sand from working down through it into the water-tank and mercury-pan. The flexible cover N of the plunger will be raised or inflated at the center by the buoyancy of the air-chamber R as the plunger makes its downstrokes, so as to facilitate the exit of the air from the plunger as the lead bed L and sand M are raised or agitated; but the cover will serve well with the air-tube O alone and without the air-chamber R.

It will be understood that the cover N will be used only when working fine sands containing very fine gold, as said cover serves, principally, to prevent the fine or float gold in tank B from settling on the surface of the sand in the plunger as the plunger is lifted in the said tank; hence none of the fine gold will be thrown away with the worked sand and be lost. In working heavier or coarser sands the gold particles therein will all quickly find their way to the mercury-pan, and the plunger may be used without the cover N when working such material. After each charge of sand is worked the plunger will be raised by the jigger-arm H until the top of the lead bed L is at the water surface, and the refuse sand will be removed to make room for the next charge of sand, which will be worked as above described. When the day's work is finished, the water in tank B will be siphoned from it by the tube or hose B' into either tank C' or C$^2$, and the filtered water may be taken from one of the tanks E and filled into the tank B for the next day's work; or the water may be changed as often as may be necessary. The system of double filtering and receiving tanks for the water avoids delays which otherwise might occur where the water-supply is limited, and enables the apparatus to be operated continuously with a very limited supply of water compared with those using a constant water flow in carrying out the separating process.

The tanks C E may be covered or floored over, if desired.

I make no claim in this application for the particular construction of the top of the mercury-pan with its pyramidal projections, as herein described, as said features will form the subject-matter of a separate application for Letters Patent which I now contemplate making.

Having thus described my invention, what I claim as new, and desire to secure by Letters Patent, is—

1. A gold-separator comprising a water-tank, a plunger-sieve operated therein, double filtering-tanks, and receivers for the filtered water, substantially as herein set forth.

2. A gold-separator comprising a water-tank, B, a plunger, G, operated therein, tanks C' C², provided with filters D, and receivers E for the filtered water, substantially as herein set forth.

3. In a gold-separator, the combination, with a water-tank and a plunger-sieve operated therein, of a cover applied to the plunger and provided with an outlet for the air from the interior of the plunger, substantially as herein set forth.

4. In a gold-separator, the combination, with a water-tank and a plunger-sieve operated therein, of a flexible cover applied to the plunger and provided with an outlet for the air from the interior of the plunger, substantially as herein set forth.

5. In a gold-separator, the combination, with a water-tank and a plunger-sieve operated therein, of a flexible cover, N, applied to the plunger, and provided with a float-chamber, R, and an outlet for the air from the interior of the plunger, substantially as herein set forth.

6. In a gold-separator, the combination, with the plunger G, the jigger-arm H, and the plunger-hangers G', of the bars $g^2$, provided with series of holes $g^3$, and the pins or screws $g^4$, substantially as herein set forth.

SAMUEL C. OLIPHANT.

Witnesses:
SAMUEL M. PICKLER,
JOHN SHOWER.